US012613669B2

(12) United States Patent
Ouyang

(10) Patent No.: US 12,613,669 B2
(45) Date of Patent: Apr. 28, 2026

(54) SCREEN PROJECTION METHOD, SCREEN PROJECTION APPARATUS, ELECTRONIC DEVICE AND STORAGE MEDIUM

(71) Applicants:GUANGZHOU SHIYUAN ELECTRONICS TECHNOLOGY COMPANY LIMITED, Guangzhou (CN); GUANGZHOU SHIRUI ELECTRONICS CO. LTD., Guangzhou (CN)

(72) Inventor: Yuji Ouyang, Guangzhou (CN)

(73) Assignees: GUANGZHOU SHIYUAN ELECTRONICS TECHNOLOGY COMPANY LIMITED, Guangzhou (CN); GUANGZHOU SHIRUI ELECTRONICS CO. LTD., Guangzhou (CN)

( * ) Notice: Subject to any disclaimer, the term of this patent is extended or adjusted under 35 U.S.C. 154(b) by 0 days.

(21) Appl. No.: 18/687,500

(22) PCT Filed: Sep. 15, 2022

(86) PCT No.: PCT/CN2022/119008
§ 371 (c)(1),
(2) Date: Feb. 28, 2024

(87) PCT Pub. No.: WO2023/030548
PCT Pub. Date: Mar. 9, 2023

(65) Prior Publication Data
US 2024/0397023 A1      Nov. 28, 2024

(30) Foreign Application Priority Data

Sep. 1, 2021    (CN) .......................... 202111020876.9

(51) Int. Cl.
*G06F 3/14* (2006.01)
*G09G 5/14* (2006.01)
(Continued)

(52) U.S. Cl.
CPC ............. *G06F 3/1446* (2013.01); *G09G 5/14* (2013.01); *H04N 21/43635* (2013.01); *G09G 2370/20* (2013.01)

(58) Field of Classification Search
CPC .. H04N 5/74; H04N 7/01; H04N 7/14; H04N 7/15; H04N 7/16; H04N 9/31;
(Continued)

(56) References Cited

U.S. PATENT DOCUMENTS

2010/0064260 A1* 3/2010 Amano .................... G09G 5/14
715/859
2010/0302130 A1 12/2010 Kikuchi et al.
(Continued)

FOREIGN PATENT DOCUMENTS

CN      106856563  A      6/2017
CN      107690612  A      2/2018
(Continued)

OTHER PUBLICATIONS

Notice of refusal received for JP Patent Application No. 2023-578693, mailed on Nov. 12, 2024.
(Continued)

*Primary Examiner* — Chanh D Nguyen
*Assistant Examiner* — Nguyen H Truong
(74) *Attorney, Agent, or Firm* — Zhong Law, LLC

(57) ABSTRACT

The present disclosure disclosed a method for projecting a device screen, apparatus, device, and storage medium. The method includes: when a screen projection instruction is received, determining the number of device screens to be projected; based on at least one of the principle of equal
(Continued)

distribution and/or a principle that a first display screen is projected first, and the previously-acquired number of projected device screens on each display screen and the number of device screens to be projected, determining a target display screen of each device screen to be projected; and projecting and displaying each device screen to be projected on a corresponding target display screen.

15 Claims, 6 Drawing Sheets

(51) Int. Cl.
 *H04N 21/00* (2011.01)
 *H04N 21/4363* (2011.01)

(58) Field of Classification Search
 CPC ........ H04N 21/41; H04N 21/43; H04N 21/45; H04N 21/81; H04N 21/4782; H04N 21/4363; H04N 21/4143; H04N 21/439; H04N 21/436; H04N 21/433; H04N 21/485; H04N 21/422; H04N 21/647; H04N 21/472; H04N 21/482; H04N 21/6405; H04N 21/43635; G06F 1/32; G06F 3/14; G06F 3/16; G06F 3/0354; G06F 3/048; G06F 3/0481; G06F 3/0482; G06F 3/0484; G06F 3/1446; G06F 9/451; G06F 15/16; G06F 21/31; G06F 21/60; G06F 21/62; G09G 3/00; G09G 3/20; G09G 5/00; G09G 5/12; G09G 5/14; G09G 2370/20; G06K 19/06; H04L 12/18; H04L 12/24; H04L 12/911; H04L 29/06; H04L 29/08; H04L 65/403; G06T 1/60; G06T 7/70; G06T 13/00; G06T 19/00; H04W 8/00; H04W 40/04; H04W 48/18; H04W 76/14; A63F 13/00
 See application file for complete search history.

(56) References Cited

U.S. PATENT DOCUMENTS

| | | | | |
|---|---|---|---|---|
| 2017/0154452 A1* | 6/2017 | Ishizu | ............... | H04N 21/4316 |
| 2017/0255345 A1* | 9/2017 | Veeramani | ............ | H04N 21/00 |
| 2023/0305792 A1* | 9/2023 | Zhu | ........................ | H04W 76/15 |
| 2024/0053944 A1* | 2/2024 | Jia | ............................ | G09G 5/14 |

FOREIGN PATENT DOCUMENTS

| | | | |
|---|---|---|---|
| CN | 108289241 | A | 7/2018 |
| CN | 111601120 | A | 8/2020 |
| CN | 112423073 | A | 2/2021 |
| CN | 112995575 | A | 6/2021 |
| CN | 114079816 | A | 2/2022 |
| JP | 2010278824 | A | 12/2010 |
| JP | 2011141320 | A | 7/2011 |

OTHER PUBLICATIONS

Decision of refusal received for JP Patent Application No. 2023-578693, mailed on Mar. 5, 2025.
International Search report received for PCT Patent Application No. PCT/CN2022/119008, mailed on Nov. 1, 2022, 4 pages including English translation.
Written Opinion of the International Search Authority received for PCT Patent Application No. PCT/CN2022/119008, mailed on Nov. 1, 2022, 3 pages.
Notice of refusal received for Korean Patent Application No. 10-2024-7010934, mailed on Oct. 2, 2025.
Office Action received for European Patent Application No. 22863682.5-1207, mailed on Dec. 10, 2025.

\* cited by examiner

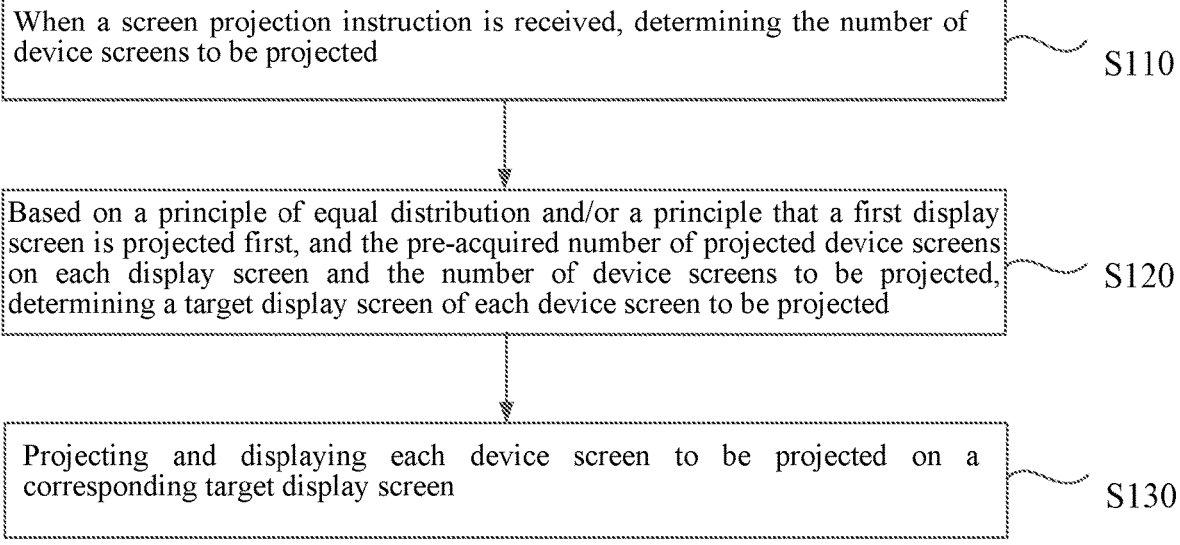

When a screen projection instruction is received, determining the number of device screens to be projected — S110

Based on a principle of equal distribution and/or a principle that a first display screen is projected first, and the pre-acquired number of projected device screens on each display screen and the number of device screens to be projected, determining a target display screen of each device screen to be projected — S120

Projecting and displaying each device screen to be projected on a corresponding target display screen — S130

Fig. 1

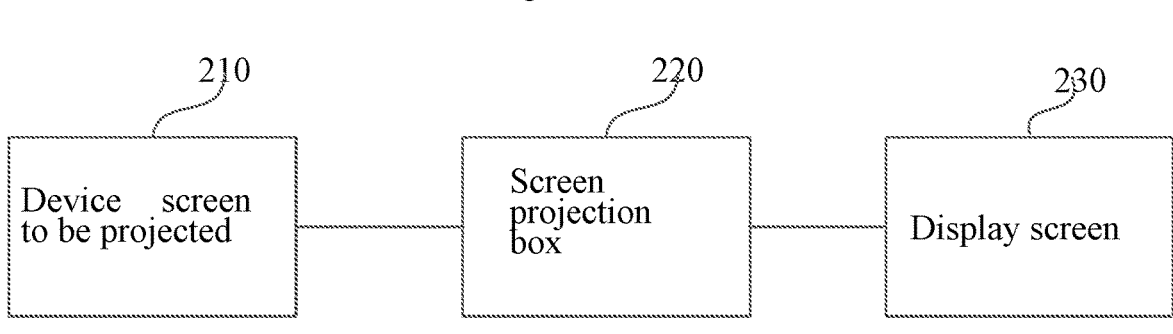

210

Device screen to be projected

220

Screen projection box

230

Display screen

Fig. 2

SCREEN PROJECTION METHOD, SCREEN PROJECTION APPARATUS, ELECTRONIC DEVICE AND STORAGE MEDIUM

CROSS-REFERENCE TO RELATED APPLICATIONS

This application is the U.S. national phase of PCT/CN2022/119008, filed Sep. 15, 2022, which claims priority benefit to Chinese Patent Application No. 202111020876.9 filed with CNIPA on Sep. 1, 2021. The entire contents of the above-mentioned applications are incorporated by reference in their entirety.

TECHNICAL FIELD

The present disclosure relates to data processing technologies, such as a method and apparatus for projecting a device screen, device, and storage medium.

BACKGROUND

With the continuous development of technology, different screen projection methods may be used for projection display. In the current technology, there are three screen projection methods. The first method involves single-screen display, when the screen projection function is used on an electronic whiteboard, all screen projection devices may be displayed on a single screen, and the issues are as follows: if there are too many participants in a meeting room, it is inconvenient for all participants to view the screen projection on a single display; if there are too many screen projection devices, it may lead to overly dense content on one screen. The second method involves dual-screen simultaneous display. A host connects two monitors through two High Definition Multimedia Interface (HDMI) cables, causing them to display same content and effectively replicating the screen. The issues with this method are as follows: if there are too many screen projection devices, it may lead to overly dense content on one screen. The third method involves dual-screen synchronous display (each screen displays a single content), for example, in the case of cash registers in convenience stores and movie theaters, the screens seen by customers and the content seen by cashiers are different. The issue is that the content on each screen is relatively single and may not be suitable for commercial screen projection.

SUMMARY

In view of this, according to the present disclosure, a method and apparatus for projecting a device screen, device and storage medium is provided.

According to a first aspect of the present disclosure, a screen projection method is provided, which includes:

responsive to receiving a screen projection instruction, determining a number of device screens to be projected;

based on at least one of the principle of equal distribution and/or a principle that a first display screen is projected first, and on a previously-acquired number of projected device screens on each display screen and a number of device screens to be projected, determining a target display screen of each device screen to be projected; and projecting and displaying each device screen to be projected on a corresponding target display screen.

According to a second aspect of the present disclosure, a screen projection apparatus is further provided, which includes:

a first determining module, configured to, when a screen projection instruction is received, determine the number of device screens to be projected;

a second determining module, configured to, based on at least one of the principle of equal distribution and/or a principle that a first display screen is projected first, and the previously-acquired number of projected device screens on each display screen and the number of device screens to be projected, determine a target display screen of each device screen to be projected; and a screen projecting module, configured to project and display each device screen to be projected on a corresponding target display screen.

According to a third aspect of the present disclosure, an electronic device is further provided, including: a communicating module, a memory, and one or more processors;

the communicating module is configured to establish a communication connection between a device screen to be projected and a display screen;

the memory is configured to store one or more programs;

when the one or more programs are executed by the one or more processors, the one or more processors are made to implement the screen projection method of any one of the above embodiments.

According to a fourth aspect of the present disclosure, a computer-readable storage medium is provided, on which a computer program is stored, and when the program is executed by a processor, the screen projection method of any one of the above-mentioned embodiments is implemented.

BRIEF DESCRIPTION OF THE DRAWINGS

FIG. 1 is a flowchart of a screen projection method according to an embodiment of the present disclosure.

FIG. 2 is a schematic diagram of device connection according to an embodiment of the present disclosure.

DESCRIPTION OF EMBODIMENTS

Figure 3:
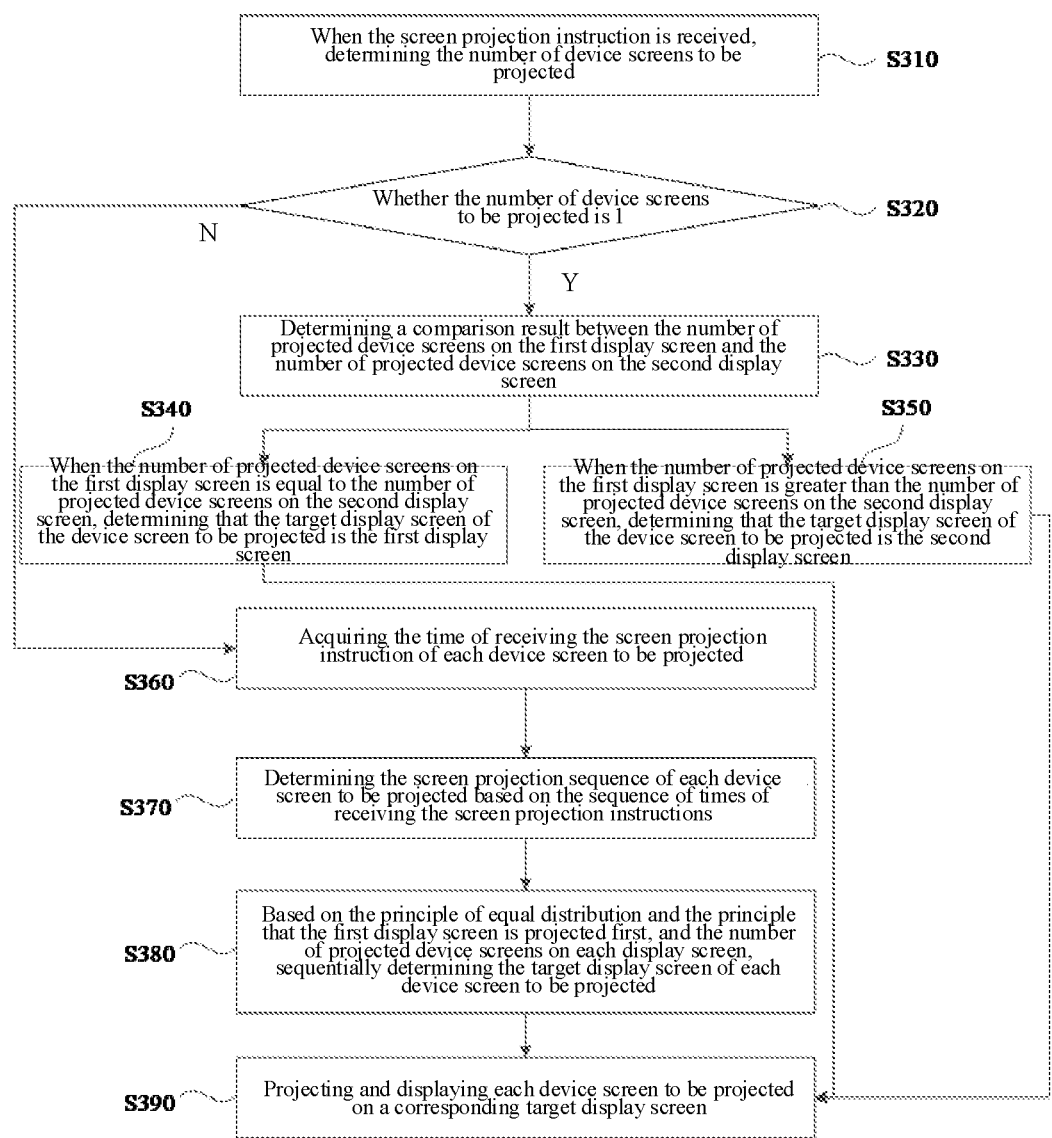
FIG. 3 is a flowchart of another screen projection method according to an embodiment of the present disclosure.

The present disclosure will be further described in detail below in conjunction with accompanying drawings and embodiments. It should be understood that the specific embodiments described herein are used to explain the present disclosure, but not to limit the scope of the present disclosure. In addition, it should be noted that, for the convenience of description, only some structures related to the present disclosure are shown in the drawings but not all structures.

In an embodiment, FIG. 1 is a flowchart of a screen projection method according to an embodiment of the present disclosure. This embodiment is applicable for evenly projecting multiple devices to be projected onto different display screens. This embodiment may be executed by an electronic device. The electronic device may be a screen projection box. As shown in FIG. 1, this embodiment includes the following steps:

S110, when a screen projection instruction is received, determining the number of device screens to be projected.

In an embodiment, the device screen to be projected and the display screen are in a same wireless network, and the display screen and the screen projection box are connected through HDMI cable. FIG. 2 is a schematic diagram of device connection according to an embodiment of the present disclosure. As shown in FIG. 2, communication connection is established between a device screen to be projected 210, a screen projection box 220, and a display screen 230. The communication connection is established between the device screen to be projected 210 and the display screen 220 through a wireless network. For example, the device screen to be projected 210 and the display screen 220 are in the same Wi-Fi network, and the communication connection is established between the screen projection box 220 and the display screen 230 through the HDMI cable.

The screen projection instruction refers to instruction information for projecting a display interface of the device screen to be projected to another display screen. In an embodiment, a screen projection control is configured on the device screen to be projected, and a user may trigger a screen projection process through the screen projection control on the device screen to be projected, that is, when the device screen to be projected receives a trigger operation on the screen projection control from a user, the device screen to be projected generates a corresponding screen projection instruction, and transmits the screen projection instruction to the screen projection box in the same network as the device screen to be projected, so that the screen projection box may project the display interface of the device screen to be projected to the display screen connected to the screen projection box.

During practical operation, the number of device screens to be projected may be determined based on the number of devices that transmit screen projection instructions, that is, the number of devices that transmit screen projection instructions is equal to the number of device screens to be projected. It may be evident, the number of device screens to be projected may also be determined based on the total number of received screen projection instructions, that is, when one screen projection instruction is received, the number of device screens to be projected is increased by one. It may be evident, after the screen projection of the device screen to be projected is completed, the number of device screens to be projected is reduced by one.

S120, based on at least one of the principle of equal distribution and/or a principle that a first display screen is projected first, and the previously-acquired number of projected device screens on each display screen and the number of device screens to be projected, determining a target display screen of each device screen to be projected.

In practical operation, the number of device screens to be projected may not be consistent with the number of display screens, that is, the number of device screens to be projected may be greater than the number of display screens, or the number of device screens to be projected may be fewer than the number of display screens. However, each display screen has limited display area. When there are more devices to be projected and fewer display screens available, to project the display interface of the device screen to be projected on the display screen as much as possible, the target display screen of the device screen to be projected may be determined by using the principle of equal distribution and/or the principle that the first display screen is projected first.

It should be noted that the device screen to be projected, the projected box and the display screen are in the same network, it may also be understood that the device screen to be projected, the projected box and the display screen are in the same region, which may be an indoor region or an outdoor region, which is not limited in the present disclosure. The first display screen refers to a main screen, that is, the main screen is configured in all the display screens within the same region, and the other display screens are secondary screens. It may be understood that the difference between the main screen and the secondary screens may be related to their different positions within the region. For example, the main screen is located at a core location of the region (e.g., at the center, or in front, depending on the specific environment), and this is not limited in the present disclosure.

In the embodiment, when the number of device screen to be projected is one and the number of projected device screens on each display screen is equal, the target display of the device screen to be projected is determined based on the principle that the first screen is projected first. When the number of device screens to be projected is one and the number of projected device screens on each display is not equal, the target display screen of the device screen to be projected is determined based on the principle of equal distribution. When there are multiple devices to be projected, the target display screen of each device screen to be projected is determined based on at least one of the principle of equal distribution and/or a principle that a first display screen is projected first, and the number of projected device screens on each display screen and the number of device screens to be projected.

It may be evident, when the display screen is initialized and started, the number of projected device screens on each display screen is 0, and when the number of projected device screens is determined to be one, the display interface of the device screen to be projected may be displayed on both the main screen and the secondary screen, which means that the main screen and the secondary screen function as duplicate screens.

S130, projecting and displaying each device screen to be projected on a corresponding target display screen.

In an embodiment, after the target display screen of each device screen to be projected is determined, the device screen to be projected is projected and displayed on the corresponding target display screen directly through the screen projection box.

In the embodiment, when a screen projection instruction is received, the number of device screens to be projected is determined. Based on at least one of the principle of equal distribution and/or the principle that a first display screen is projected first, and using information about the previously-acquired number of projected device screens on each display screen and the number of device screens to be projected, the target display screen of each device screen to be projected is determined; and each device screen to be projected is projected and displayed on a corresponding target display screen. Thereby, it achieves the capability to evenly distribute each device to different display screens when there are multiple devices to be projected.

In an embodiment, the screen projection method further includes: when a screen projection closing instruction is received, determining the projection display screen corresponding to the device whose screen is to be turned off; receiving a deleting instruction for the device whose screen is to be turned off and turned off these devices; and based on the principle of equal distribution, evenly distributing the projected device screen to each display screen. The screen projection closing instruction refers to instruction information for closing the display interface of the screen projection device on the display screen. In the embodiment, a screen projection control is configured on the device screen to be projected. After a user clicks on the screen projection control and the display interface of the device screen to be projected is successfully projected on the display screen, the device screen to be projected may become a projected device on the screen, that is, the screen projection control on the display interface of the projected device becomes the screen projection closing control. At this time, the user may directly trigger the screen projection closing process by clicking the screen projection closing control. When the screen projection closing instruction is received, the projection display screen corresponding to the device whose screen is to be turned off according to the screen projection closing instruction is determined, and then the device whose screen is to be turned off is deleted on the projection display screen, so as to delete the device whose screen is to be turned off on the display screen. It should be noted that after the device whose screen is to be turned off on the display screen is deleted, the number of projected device screens on each screen may not be evenly distributed. At this time, the projected device on each display screen is acquired, and then based on the principle of equal distribution, one of the projected devices on the display screen with the largest number of projected device screens is transferred and projected on the display screen with the least number of projected device screens.

In an embodiment, the screen projection method further includes: when an unplugging instruction of HDMI cable is detected, removing all the projected device screens on the display screen connected to the HDMI cable. In the embodiment, when each display screen is in a synchronous display, that is, when an image displayed on each display screen is different, if the user unplugs one of the HDMI cables, the removing operation is directly performed on all projected devices on the display screen connected to the HDMI cable, that is, the images of all projected devices on the display screen connected to the HDMI cable are turned off.

In an embodiment, FIG. 3 is a flowchart of another device screen projection method according to an embodiment of the present disclosure. This embodiment is based on the above embodiments, and the device screen projection process is further described. As shown in FIG. 3, the screen projection method in this embodiment includes the following steps:

S310, when the screen projection instruction is received, determining the number of device screens to be projected.

S320, determining whether the number of device screens to be projected is 1, if it is, executing S330; if not, executing S360.

S330, determining a comparison result between the number of projected device screens on a first display screen and the number of projected device screens on a second display screen.

S340, when the number of projected device screens on the first display screen is equal to the number of projected device screens on the second display screen, determining that the target display screen of the device screen to be projected is the first display screen.

S350, when the number of projected device screens on the first display screen is greater than the number of projected device screens on the second display screen, determining that the target display screen of the device screen to be projected is the second display screen.

S360, acquiring the time of receiving the screen projection instruction of each device screen to be projected.

In an embodiment, when the number of device screens to be projected is at least two, to project the display interface of the devices to be projected on the display screen as much as possible, the time of receiving the screen projection instruction of each device screen to be projected is acquired. The time of receiving the screen projection instruction refers to the time when the screen projection box receives the screen projection instruction sent by the device screen to be projected. For example, the screen projection box may be a MAXHUB WB05 box.

S370, determining the screen projection sequence of each device screen to be projected based on the sequence of times of receiving the screen projection instructions.

In the embodiment, the screen projection sequence of each device screen to be projected is sequentially determined based on the sequence of times of receiving the screen projection instructions, that is, the earlier the screen projection instruction is received by the device screen to be projected, the higher the corresponding screen projection sequence is.

S380, based on the principle of equal distribution and the principle that the first display screen is projected first, and the number of projected device screens on each display screen, sequentially determining the target display screen of each device screen to be projected.

In the embodiment, when the number of projected device screens on each display screen is equal, based on the principle that the first screen is projected first, the target display screen corresponding to the device screen to be projected that receives the screen projection instruction earlier is determined as the first display screen; then the target display screen of the second to-be-projected device is determined as the secondary screen (for example, the second display screen) based on the principle of equal distribution, and the similar operation is performed until the target display screen of each device screen to be projected is determined.

S390, projecting and displaying each device screen to be projected on a corresponding target display screen.

It follows, in the practical operation process, the projection position of the projected device may also be moved manually by dragging and dropping. For example, assuming that there are two projected devices on the main screen and one projected device on the secondary screen, when a screen projection closing instruction is received from the projected device on the secondary screen, the secondary screen may be automatically or manually deleted, and a projected device on the main screen is manually dragged to the secondary screen, so that a projected device is evenly distributed on each display.

It follows, a maximum number of devices displayed on each display screen may also be configured, that is, when the number of projected device screens on each screen exceeds the maximum number of displayed devices, the display screen may not be able to display the device screen to be projected. For example, assuming that the maximum number of displayed devices on each display screen is 9, the maximum number of projected device screens on each display screen is 9.

In this embodiment, based on the principle of equal distribution and/or the principle that the first display screen is projected first, and the previously-acquired number of projected device screens on each display screen and the number of device screens to be projected, the target display screen of each device screen to be projected is determined, and each device screen to be projected is projected and displayed on a corresponding target display screen. Thereby, it achieves the capability to evenly distribute each device to different display screens when there are multiple devices to be projected.

Figure 4:
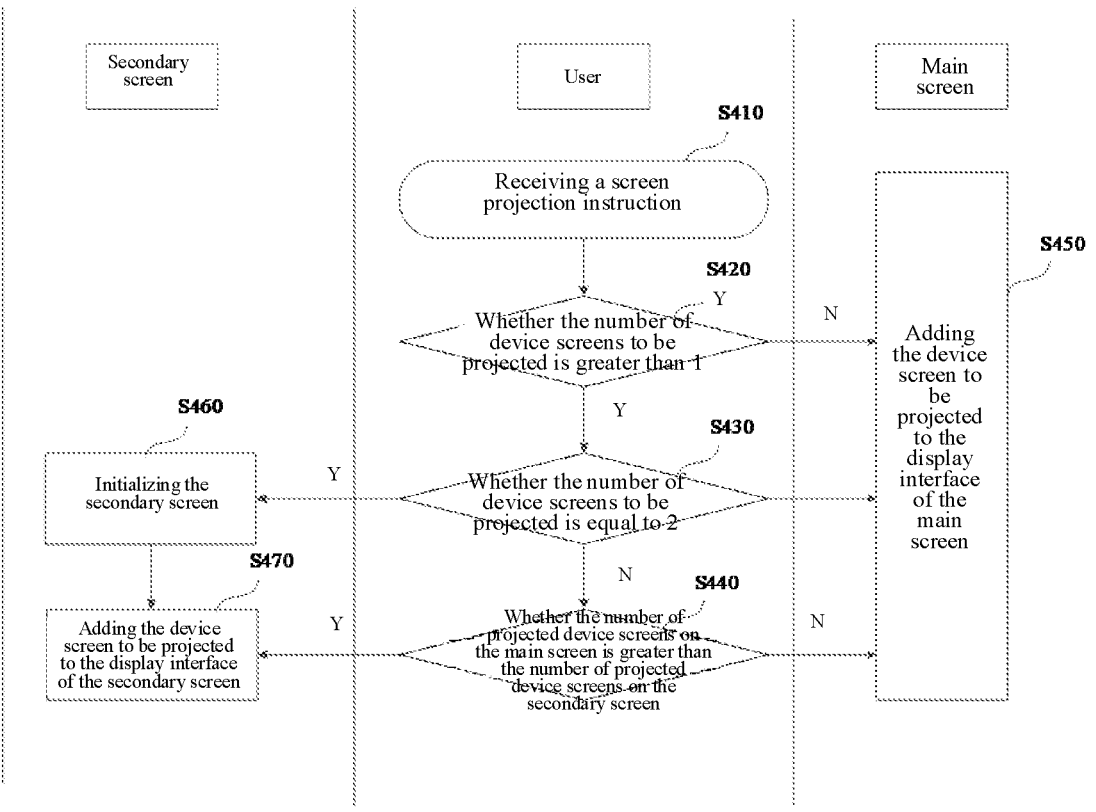
FIG. 4 is an interactive schematic diagram of a device screen projection according to an embodiment of the present disclosure.

In an embodiment, FIG. 4 is an interactive schematic diagram of device screen projection according to an embodiment of the present disclosure. In this embodiment, by taking the first display screen as the main screen and the second display screen as the secondary screen as an example, the device screen projection process may be described. As shown in FIG. 4, the device screen projection process in this embodiment includes the following steps:

S410, receiving a screen projection instruction.

S420, determining whether the number of device screens to be projected is greater than 1, if it is, executing S430; if not, executing S450.

S430, determining whether the number of device screens to be projected is equal to 2, if not, executing S440; if it is, executing S460.

S440, determining whether the number of projected device screens on the main screen is greater than the number of projected device screens on the secondary screen, if not, executing S450; if it is, executing S470.

S450, adding the device screen to be projected to the display interface of the main screen.

S460, initializing the secondary screen.

S470, adding the device screen to be projected to the display interface of the secondary screen.

In an embodiment, when the user starts to perform screen projection, if there is one device screen to be projected (that is, there are 0 projected devices and 1 device screen to be projected) that needs to be projected, both the main screen and the secondary screen display the screen projection device, that is, the main screen and the secondary screen function as duplicate screens.

When the second to-be-projected device (i.e., 1 device is projected on the main screen and 0 devices are projected on the secondary screen) needs to be projected, the secondary screen (using Presentation of Android system) is initialized, and the second to-be-projected device is added to the secondary screen.

When the number of device screens to be projected is greater than 2, determine whether the number of projected device screens on the main screen is greater than the number of projected device screens on the secondary screen. The number of projected device screens on the main screen and the number of projected device screens on the secondary screen may be recorded in a hypervisor. Based on the principle of equal distribution and the principle that the main screen is projected first, project the devices to be projected. When the number of projected device screens on the main screen is equal to the number of projected device screens on the secondary screen, directly project the first to-be-projected device on the main screen, and then project the second to-be-projected device on the secondary screen. For example, if there is a projected device on the main screen and a projected device on the secondary screen, the device screen to be projected is added to the main screen at this time. If the number of projected device screens on the main screen is greater than that the number of projected device screens on the secondary screen, the device screen to be projected is added to the secondary screen. For example, if there are two projected devices on the main screen and one projected device on the secondary screen, the device screen to be projected is added to the secondary screen. According to this embodiment, when screen projection is performed multiple devices to be projected and two display screens are connected, the display images of different devices to be projected may be displayed on different display screens, and images of multiple devices to be projected are evenly distributed on different display screens.

Figure 5:
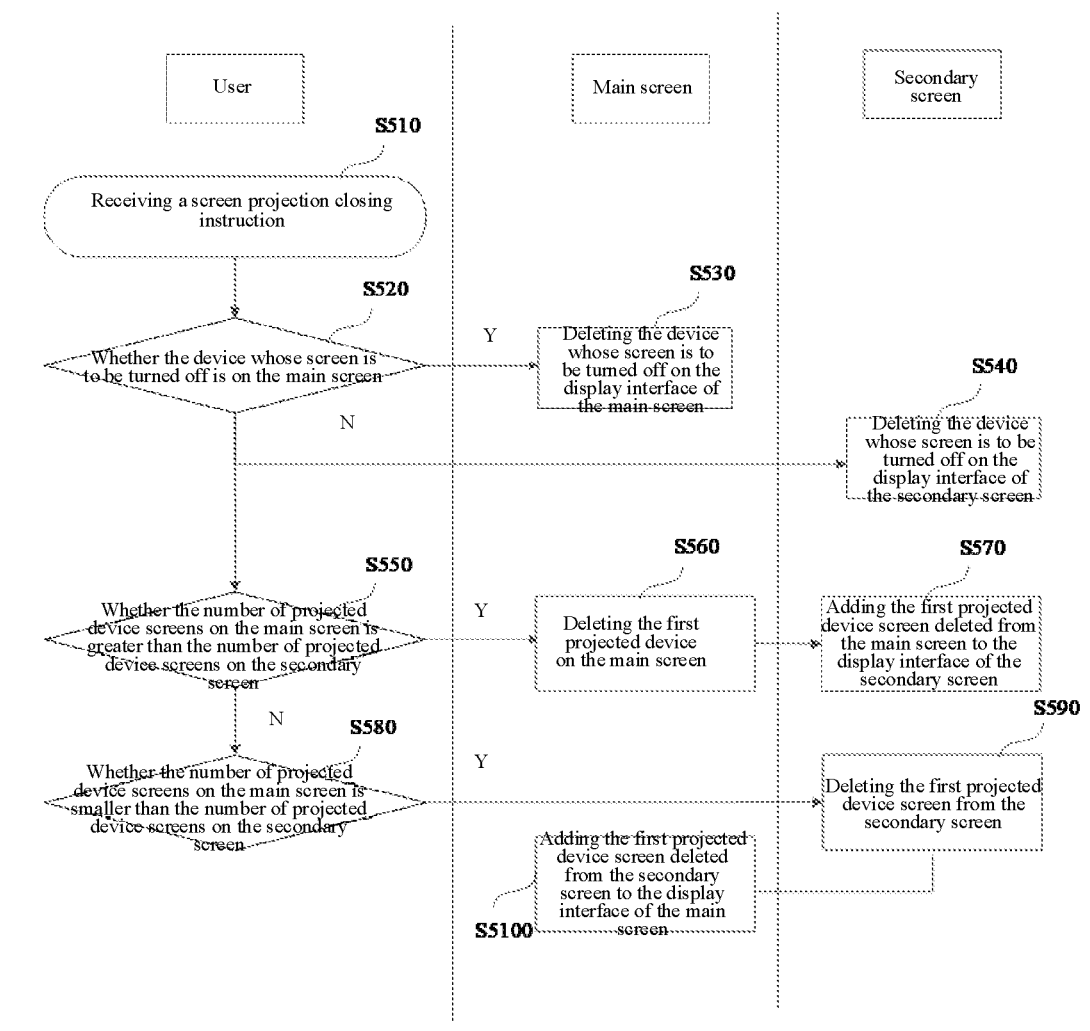
FIG. 5 is an interactive schematic diagram of another device screen projection according to an embodiment of the present disclosure.

In an embodiment, FIG. 5 is an interactive schematic diagram of another device screen projection according to an embodiment of the present disclosure. In this embodiment, taking the first display screen as the main screen and the second display screen as the secondary screen as an example, when a screen projection closing instruction is received, the device screen projection process may be described. As shown in FIG. 5, the device screen projection process in this embodiment includes the following steps:

S510, receiving a screen projection closing instruction.

S520, determining whether the device whose screen is to be turned off is on the main screen, if it is, executing S530; if not, executing S540.

S530, deleting the device whose screen is to be turned off on the display interface of the main screen.

S540, deleting the device whose screen is to be turned off on the display interface of the secondary screen.

S550, after the screen projection of the device whose screen is to be turned off is closed, determining whether the number of projected device screens on the main screen is greater than the number of projected device screens on the secondary screen, if it is, executing S560; if not, executing S580.

S560, deleting the first projected device on the main screen.

S570, adding the first projected device screen deleted from the main screen to the display interface of the secondary screen.

S580, determining whether the number of projected device screens on the main screen is smaller than the number of projected device screens on the secondary screen, if it is, executing S590.

S590, deleting the first projected device screen from the secondary screen.

S5100, adding the first projected device screen deleted from the secondary screen to the display interface of the main screen.

In the embodiment, when the user turns off the screen projection device, the display screen where the device whose screen is to be turned off is determined, that is, the deleting operation is performed on the display screen where the device whose screen is to be turned off. It may also be understood that the device whose screen is to be turned off is deleted from the display screen, and then based on the principle of equal distribution, the projected devices are evenly distributed. For example, there are two projected devices on the main screen and one projected device on the secondary screen. When the closing operation is performed on the projected device on the secondary screen, that is, the device whose screen is to be turned off is the projected device on the secondary screen, then after the projected device is deleted from the secondary screen, a projected device on the main screen is moved to the secondary screen, that is, the two screens display the image of a projected device respectively.

Figure 6:
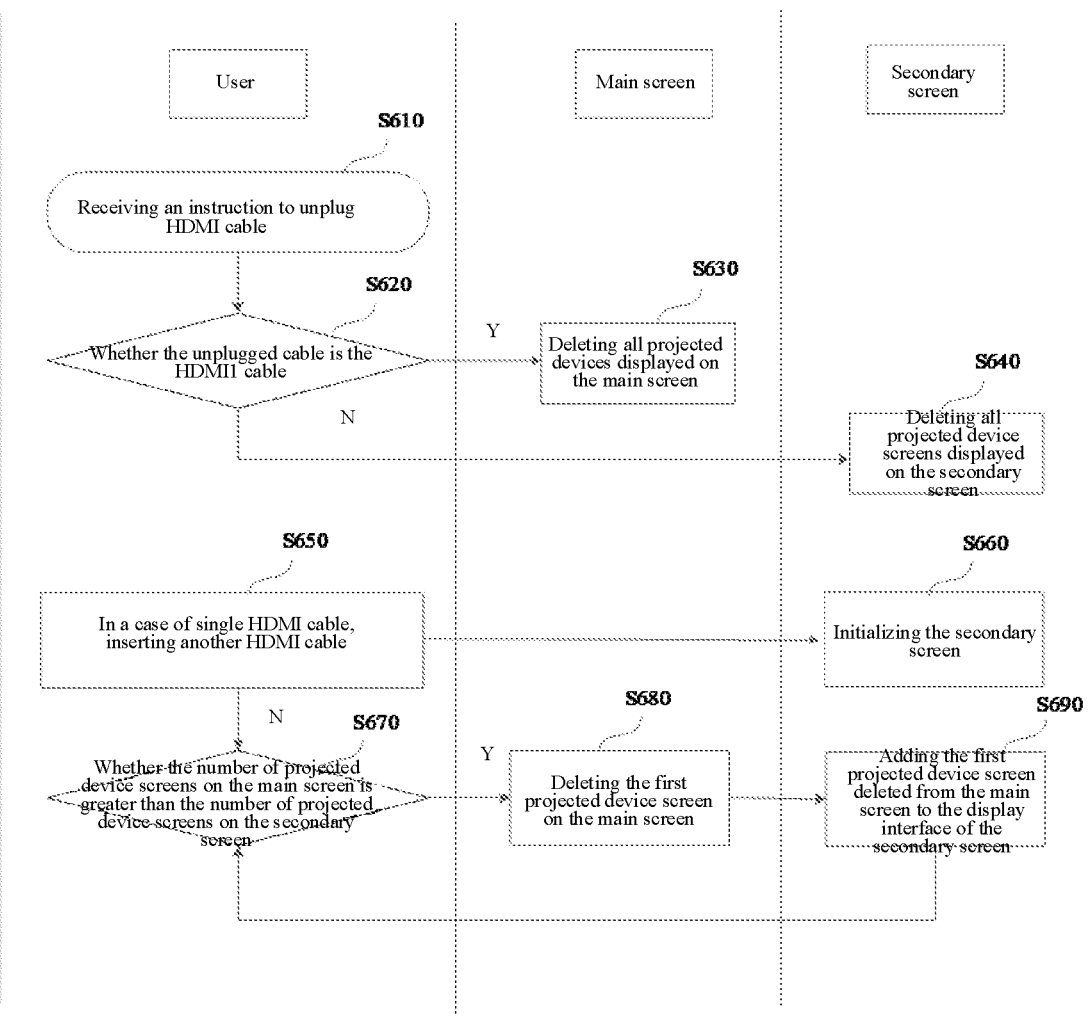
FIG. 6 is an interactive schematic diagram of still another device screen projection according to an embodiment of the present disclosure.

In an embodiment, FIG. 6 is an illustrative diagram depicting the interaction for device screen projection according to an embodiment of the present disclosure. In this embodiment, taking the first display screen as the main screen and the second display screen as the secondary screen as an example, when a HDMI unplugging instruction is received, the device screen projection process is described. As shown in FIG. 6, the device screen projection process in this embodiment includes the following steps:

S610, receiving an instruction to unplug the HDMI cable.

S620, determining whether the unplugged cable is the HDMI1 cable, if it is, executing S630; if not, executing S640.

S630, deleting all projected device screens displayed on the main screen.

S640, deleting all projected device screens displayed on the secondary screen.

S650, in a case of a single HDMI cable, inserting another HDMI cable.

S660, initializing the secondary screen.

S670, determining whether the number of projected device screens on the main screen is greater than the number of projected device screens on the secondary screen, if it is, executing S680.

S680, deleting the first projected device screen on the main screen.

S690, adding the first projected device screen deleted from the main screen to the display interface of the secondary screen, and returning to S670.

In an embodiment, when the two display screens are in a dual-screen synchronous display, when the user unplugs one of the HDMI cables, all projected devices on the display screen corresponding to the HDMI cable are removed. For example, assuming that there are three projected devices on the main screen and two projected devices on the secondary screen, when the user unplugs HDMI1, all the projected device screens on the main screen corresponding to HDMI1 may be turned off.

Figure 7:
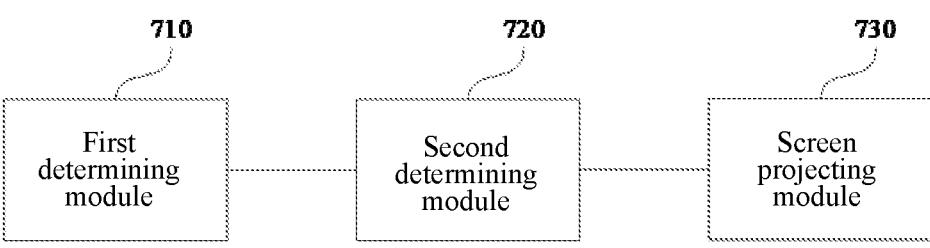
FIG. 7 is a structural block diagram of a screen projection apparatus according to an embodiment of the present disclosure.

In an embodiment, FIG. 7 is a structural block diagram of a screen projection apparatus according to an embodiment of the present disclosure. This apparatus is suitable for evenly projecting multiple devices to be projected onto different display screens. The apparatus may be implemented by hardware/software. As shown in FIG. 7, the apparatus includes: a first determining module 710, a second determining module 720, and a screen projecting module 730.

The first determining module 710 is configured to, when a screen projection instruction is received, determine the number of device screens to be projected.

The second determining module 720 is configured to, based on at least one of the principle of equal distribution and/or a principle that a first display screen is projected first, and the previously-acquired number of projected device screens on each display screen and the number of device screens to be projected, determine a target display screen of each device screen to be projected The screen projecting module 730 is configured to project and display each device screen to be projected on a corresponding target display screen.

In this embodiment, when a screen projection instruction is received, the number of device screens to be projected is determined; based on at least one of the principle of equal distribution and/or a principle that a first display screen is projected first, and the previously-acquired number of projected device screens on each display screen and the number of device screens to be projected, a target display screen of each device screen to be projected is determined; and each device screen to be projected is projected and displayed on a corresponding target display screen. Thereby, it achieves the capability to evenly distribute each device to different display screens when there are multiple devices to be projected.

On the basis of the above embodiments, the apparatus for projecting the device screen further includes:

a third determining module, configured to, when a screen projection closing instruction is received, determine the projection display screen corresponding to the device whose screen is to be turned off;

a deleting module, configured to receive a deleting instruction for the device whose screen is to be turned off on the projection display screen, to delete the device whose screen is to be turned off; and a distributing module, configured to, based on the principle of equal distribution, evenly distribute the projected device screen to each display screen.

On the basis of the above embodiments, the apparatus for projecting the device screen further includes:

a removing module, configured to, when an unplugging instruction of HDMI cable is detected, remove all the projected device screens on the display screen connected by the HDMI cable.

On the basis of the above embodiments, when two display screens are used for screen projection display, and the number of device screens to be projected is one, the second determining module includes:

a first determining unit, configured to determine a comparison result between the number of projected device screens on a first display screen and the number of projected device screens on a second display screen;

a second determining unit, configured to, when the number of projected device screens on the first display screen is equal to the number of projected device screens on the second display screen, determine that the target display screen of the device screen to be projected is the first display screen; and a third determining unit, configured to, when the number of projected device screens on the first display screen is greater than the number of projected device screens on the second display screen, determine that the target display screen of the device screen to be projected is the second display screen.

On the basis of the above embodiments, when two display screens are used for screen projection display, and the number of device screens to be projected is at least two, the apparatus for projecting the device screen further includes:

an acquiring module, configured to acquire the time of receiving the screen projection instruction of each device screen to be projected before the target display screen of each device screen to be projected is determined based on the previously-acquired number of projected device screens on each display screen and the number of device screens to be projected.

On the basis of the above embodiments, when the number of device screens to be projected is at least two, the second determining module includes:

a fourth determining unit, configured to determine the screen projection sequence of each device screen to be projected based on the sequence of times of receiving the screen projection instructions; and a fifth determining unit, configured to, based on the principle of equal distribution and the principle that the first display screen is projected first, and the number of projected device screens on each display screen, sequentially determine the target display screen of each device screen to be projected.

On the basis of the above embodiments, the device screen to be projected and the display screen are in the same wireless network, and the display screen and the screen projection box are connected through the HDMI cable.

The apparatus for projecting the device screen described above may execute the screen projection method according to any embodiment of the present disclosure, and has corresponding functional modules and beneficial effects for executing the screen projection method.

Figure 8:
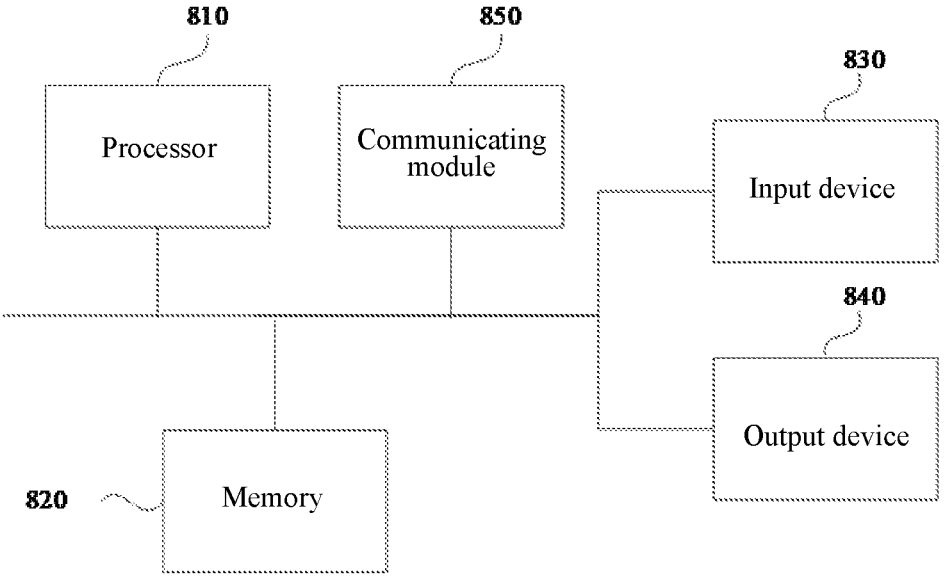
FIG. 8 is a schematic diagram of a hardware structure of an electronic device according to an embodiment of the present disclosure.

FIG. 8 is a schematic diagram of a hardware structure of an electronic device according to an embodiment of the present disclosure. The device in the embodiment of the present disclosure is described by taking a screen projection box as an example. As shown in FIG. 8, the screen projection box according to the embodiment of the present disclosure includes: a processor 810, a memory 820, an input device 830, an output device 840 and a communicating module 850. There may be one or more processors 810 in the screen projection box. One processor 810 is taken as an example FIG. 8. The processor 810, the memory 820, the input device 830, the output device 840 and the communicating module 850 in the screen projection box may be connected through a bus or in other ways, and the connection through a bus is taken as an example in FIG. 8.

The memory 820 in the screen projection box is a computer-readable storage medium, which may be used to store one or more programs, and the programs may be software programs, computer executable programs and modules, such as instructions/modules corresponding to the embodiment of the present disclosure or the provided device screen projection method (for example, the modules in the apparatus for projecting the device screen shown in FIG. 6, including: a first determining module 610, a second determining module 620, and a screen projecting module 630). The processor 810 runs the software programs, instructions and modules stored in the memory 820 to execute various functional applications and data processing of the screen projection box, that is, to implement the screen projection method in the above method embodiments.

The memory 820 may include a program storage area and a data storage area. The program storage area may store an operating system and an application program required by at least one function; the data storage area may store data created according to usage of the device, and the like. In addition, the memory 820 may include a high-speed random access memory, and may further include a non-volatile memory, such as at least one magnetic disk storage device, flash memory device, or other non-volatile solid-state storage devices. In some instances, the memory 820 may further include memory arranged remotely relative to the processor 810, and these remote memories may be connected to the device through a network. Examples of the above-mentioned networks include, but are not limited to, the Internet, intranets, local area networks, mobile communication networks, and combinations thereof.

The input device 830 may be used to receive numeric or character information input by the user, so as to generate key signal input related to user settings and function control of the terminal device. The output device 840 may include a display device such as a display screen. The communicating module 850 is configured to establish a communication connection between the device screen to be projected and the display screen.

Moreover, when one or more programs included in the above-mentioned cloud server are executed by one or more processors 810, the program performs the following operations: when a screen projection instruction is received, determining the number of device screens to be projected; based on at least one of the principle of equal distribution and/or a principle that a first display screen is projected first, and the previously-acquired number of projected device screens on each display screen and the number of device screens to be projected, determining a target display screen of each device screen to be projected; and projecting and displaying each device screen to be projected on a corresponding target display screen.

According to the embodiment of the present disclosure, a computer-readable storage medium is further provided, on which a computer program is stored. When the program is executed by a processor, the screen projection method according to the embodiment of the present disclosure is implemented. The method includes: when a screen projection instruction is received, determining the number of device screens to be projected; based on at least one of the principle of equal distribution and/or a principle that a first display screen is projected first, and the previously-acquired number of projected device screens on each display screen and the number of device screens to be projected, determining a target display screen of each device screen to be projected; and projecting and displaying each device screen to be projected onto a corresponding target display screen.

The computer storage medium in the embodiments of the present disclosure may use any combination of one or more computer-readable media. The computer readable medium may be a computer readable signal medium or a computer readable storage medium. For example, a computer-readable storage medium may not be limited to, an electrical, magnetic, optical, electromagnetic, infrared, or semiconductor system, apparatus, or device, or any combination thereof. More specific examples (non-exhaustive list) of the computer-readable storage media include: electrical connections with one or more wires, portable computer disks, hard disks, Random Access Memory (RAM), Read-Only Memory (ROM), Erasable Programmable ROM (EPROM or flash memory), optical fiber, portable Compact Disc Read-Only Memory (CD-ROM), optical storage devices, magnetic storage device, or any suitable combination of the above. In this description, a computer-readable storage medium may be any tangible medium that contains or stores a program, and this program may be used by or in conjunction with an instruction execution system, apparatus, or device.

A computer readable signal medium may include a data signal in baseband or serve as a part of a carrier wave, which carries computer readable program codes. Such propagated data signals may take many forms, including but not limited to electromagnetic signals, optical signals, or any above-mentioned suitable combination. The computer-readable signal medium may also be any computer-readable medium other than a computer-readable storage medium, which may transmit, propagate, or transmit a program used by or in conjunction with an instruction execution system, apparatus, or device.

Program code included in a computer readable medium may be transmitted by using any appropriate medium, including but not limited to wireless, wireline, optical fiber cable, RF, etc., or any suitable combination.

Computer program code for performing the operations of the present disclosure may be written in one or more programming languages or combinations thereof. The programming languages may include object-oriented programming languages such as Java, Smalltalk, C++, and conventional procedural programming languages, such as the "C" language or a similar programming language. The program code may be executed entirely on the computer of users, partly on the computer of users, as a stand-alone software package, partly on the computer of users and partly on a remote computer, or entirely on the remote computer or server. In a cases of involving a remote computer, the remote computer may be connected to the computer of the user through any kind of network, including a local area network (LAN) or a wide area network (WAN), or may be connected to an external computer (such as through an internet connection by using an internet service provider).

It is noted that the above are preferred embodiments of the present disclosure and applied technical principles. Those skilled in the art may understand that the present disclosure is not limited to the specific embodiments described herein, and that various obvious changes, readjustments and substitutions may be made by those skilled in the art without departing from the protection scope of the present disclosure. Therefore, although the present disclosure has been described in detail through the above embodiments, the present disclosure is not limited to the above embodiments, and may also include more other equivalent embodiments without departing from the concept of the present disclosure, and the scope of the present disclosure is determined by the scope of the appended claims.

What is claimed is:

1. A screen projection method, comprising:

responsive to receiving a screen projection instruction, determining a number of device screens to be projected;

based on at least one of a principle of equal distribution or a principle that a first display screen is projected first, and on a number of previously-acquired projected device screens on each display screen and a number of device screens to be projected, determining a target display screen of each device screen to be projected; and projecting and displaying each device screen to be projected on a corresponding target display screen, wherein when two display screens are used for screen projection display, and the number of device screens to be projected is one, based on at least one of the principle of equal distribution or the principle that a first display screen is projected first, and on a number of previously-acquired projected device screens on each display screen and the number of device screens to be projected, determining a target display screen of each device screen to be projected further comprises:

determining a comparison result between the number of projected device screens on a first display screen and the number of projected device screens on a second display screen, when the number of projected device screens on the first display screen is equal to the number of projected device screens on the second display screen, determining that the target display screen of the device screen to be projected is the first display screen, when the number of projected device screens on the first display screen is greater than the number of projected device screens on the second display screen, determining that the target display screen of the device screen to be projected is the second display screen.

2. The screen projection method of claim 1, further comprising:

responsive to receiving a screen projection closing instruction, determining the projection display screen corresponding to a device whose screen is to be turned off;

receiving a deleting instruction for the device whose screen is to be turned off on the projection display screen, and deleting the device whose screen is to be turned off; and based on the principle of equal distribution, evenly distributing the projected device screen to each display screen.

3. The screen projection method of claim 1, further comprising:

responsive to detecting an unplugging instruction of High Definition Multimedia Interface (HDMI) cable, removing all the projected device screens on the display screen connected to the HDMI cable.

4. The screen projection method of claim 1, wherein when two display screens are used for screen projection display, and the number of device screens to be projected is at least two, based on the number of previously-acquired projected device screens on each display screen and the number of device screens to be projected, determining a target display screen of each device screen to be projected further comprises:

acquiring the time of receiving the screen projection instruction of each device screen to be projected.

5. The screen projection method of claim 4, wherein when the number of device screens to be projected is at least two, based on at least one of a principle of equal distribution or a principle that a first display screen is projected first, and on the number of previously-acquired projected device screens on each display screen and the number of device screens to be projected, determining a target display screen of each device screen to be projected further comprises:

determining a screen projection sequence of each device screen to be projected based on a sequence of times of receiving the screen projection instructions; and based on the principle of equal distribution and the principle that the first display screen is projected first, and on the number of projected device screens on each display screen, sequentially determining the target display screen of each device screen to be projected.

6. The screen projection method of claim 1, wherein the device screen to be projected and the display screen are in the same wireless network, and the display screen and the screen projection box are connected through the HDMI cable.

7. An electronic device, comprising: a communicating module;

a memory; and one or more processors, wherein the communicating module is configured to establish a communication connection between a device screen to be projected and a display screen;

the memory is configured to store one or more programs;

the one or more programs, when executed by the one or more processors, performs a screen projection method, the screen projection method comprising:

when a screen projection instruction is received, determining the number of device screens to be projected;

based on a principle of equal distribution and/or a principle that a first display screen is projected first, and a previously-acquired number of projected device screens on each display screen and the number of device screens to be projected, determining a target display screen of each device screen to be projected; and projecting and displaying each device screen to be projected on a corresponding target display screen, wherein when two display screens are used for screen projection display, and the number of device screens to be projected is one, based on a principle of equal distribution and/or a principle that a first display screen is projected first, and the pre-acquired number of projected device screens on each display screen and the number of device screens to be projected, determining a target display screen of each device screen to be projected comprises:

determining a comparison result between the number of projected device screens on the first display screen and the number of projected device screens on the second display screen;

when the number of projected device screens on the first display screen is equal to the number of projected device screens on the second display screen, determining that the target display screen of the device screen to be projected is the first display screen;

when the number of projected device screens on the first display screen is greater than the number of projected device screens on the second display screen, determining that the target display screen of the device screen to be projected is the second display screen.

8. The electronic device of claim 7, wherein the one or more programs, when executed by the one or more processors, further performs the following steps:

when a screen projection closing instruction is received, determining the projection display screen corresponding to the device whose screen is to be turned off;

receiving a deleting instruction for the device whose screen is to be turned off on the projection display screen, to delete the device whose screen is to be turned off; and based on the principle of equal distribution, evenly distributing the projected device screen to each display screen.

9. The electronic device of claim 7, wherein the one or more programs, when executed by the one or more processors, further performs the following step:

when an unplugging instruction of High Definition Multimedia Interface (HDMI) cable is detected, removing all the projected device screens on the display screen connected to HDMI cable.

10. The electronic device of claim 7, wherein when two display screens are used for screen projection display, and the number of device screens to be projected is at least two, based on the pre-acquired number of projected device screens on each display screen and the number of device screens to be projected, determining a target display screen of each device screen to be projected further comprises:

acquiring the time of receiving the screen projection instruction of each device screen to be projected.

11. The electronic device of claim 10, wherein when the number of device screens to be projected is at least two, based on a principle of equal distribution and/or a principle that a first display screen is projected first, and the pre-acquired number of projected device screens on each display screen and the number of device screens to be projected, determining a target display screen of each device screen to be projected further comprises:

determining the screen projection sequence of each device screen to be projected based on the sequence of times of receiving the screen projection instructions; and based on the principle of equal distribution and the principle that the first display screen is projected first, and the number of projected device screens on each display screen, sequentially determining the target display screen of each device screen to be projected.

12. The electronic device of claim 7, wherein the device screen to be projected and the display screen are in the same wireless network, and the display screen and the screen projection box are connected through HDMI cable.

13. A computer-readable non-transitory storage medium, on which a computer program is stored, wherein the computer program, when executed by a processor, performs a screen projection method, the screen projection method comprising:

when a screen projection instruction is received, determining the number of device screens to be projected;

based on a principle of equal distribution and/or a principle that a first display screen is projected first, and a previously-acquired number of projected device screens on each display screen and the number of device screens to be projected, determining a target display screen of each device screen to be projected; and projecting and displaying each device screen to be projected on a corresponding target display screen, wherein when two display screens are used for screen projection display, and the number of device screens to be projected is one, based on at least one of the principle of equal distribution or the principle that a first display screen is projected first, and on a number of previously-acquired projected device screens on each display screen and the number of device screens to be projected, determining a target display screen of each device screen to be projected further comprises:

determining a comparison result between the number of projected device screens on a first display screen and the number of projected device screens on a second display screen, when the number of projected device screens on the first display screen is equal to the number of projected device screens on the second display screen, determining that the target display screen of the device screen to be projected is the first display screen, when the number of projected device screens on the first display screen is greater than the number of projected device screens on the second display screen, determining that the target display screen of the device screen to be projected is the second display screen.

14. The Computer-readable non-transitory storage medium of claim 13, wherein when two display screens are used for screen projection display, and the number of device screens to be projected is at least two, based on the number of previously-acquired projected device screens on each display screen and the number of device screens to be projected, determining a target display screen of each device screen to be projected further comprises:

acquiring the time of receiving the screen projection instruction of each device screen to be projected.

15. The Computer-readable non-transitory storage medium of claim 14, wherein when the number of device screens to be projected is at least two, based on at least one of a principle of equal distribution or a principle that a first display screen is projected first, and on the number of previously-acquired projected device screens on each display screen and the number of device screens to be projected, determining a target display screen of each device screen to be projected further comprises:

determining a screen projection sequence of each device screen to be projected based on a sequence of times of receiving the screen projection instructions; and based on the principle of equal distribution and the principle that the first display screen is projected first, and on the number of projected device screens on each display screen, sequentially determining the target display screen of each device screen to be projected.

\* \* \* \* \*